United States Patent [19]

Bermes

[11] 4,058,517

[45] Nov. 15, 1977

[54] PREPARATION OF A CONCENTRATED SOLUTION OF AN ANIONIC AZO DYE CONTAINING A SULFONIC ACID GROUP

[75] Inventor: Rudolf Bermes, Ludwigshafen, Germany

[73] Assignee: Badische Anilin- & Soda-Fabrik Aktiengesellschaft, Ludwigshafen (Rhine), Germany

[21] Appl. No.: 334,194

[22] Filed: Feb. 21, 1973

[30] Foreign Application Priority Data

Feb. 29, 1972   Germany ............................. 2209478

[51] Int. Cl.² ...................... C09B 29/06; C09B 29/10; C09B 29/24; C09B 29/38
[52] U.S. Cl. .................................... 260/155; 260/144; 260/157; 260/160; 260/161; 260/162; 260/163; 260/165; 260/178; 260/182; 260/194; 260/195; 260/197; 260/198
[58] Field of Search ................ 260/160, 161, 162, 163, 260/187, 152, 157, 198, 165, 144, 155, 178, 182, 194, 197, 195

[56] References Cited

U.S. PATENT DOCUMENTS 2,418,416   4/1947   Locke .................................. 260/195
3,793,305   2/1974   Balon .................................. 260/154

FOREIGN PATENT DOCUMENTS 1,644,319   11/1970   Germany ............................. 260/144
1,240,412   7/1971   United Kingdom ................. 260/144

OTHER PUBLICATIONS

Saunders, "The Aromatic Diazo-Compounds and Their Technical Applications", pp. 3, 18 and 19 (1949).

*Primary Examiner*—Floyd D. Higel
*Attorney, Agent, or Firm*—Keil, Thompson & Shurtleff

[57] ABSTRACT

Process of preparing a concentrated solution of a water-soluble anionic azo dye containing 1 to 4 sulfonic acid groups by diazotization and coupling of a diazo and coupling component, respectively, in the solvent or solvent mixture required for the concentrated solution which should have as essential solvents water and/or water-soluble or water-miscible organic solvents other than carboxylic acids. Diazotization is carried out with a nitrous acid ester of a hydroxy-substituted aliphatic hydrocarbon, e.g., an alkyl nitrite. The process provides highly stable concentrated or stock solutions of unlimited miscibility with water for use in continuous dyeing methods.

8 Claims, No Drawings

PREPARATION OF A CONCENTRATED SOLUTION OF AN ANIONIC AZO DYE CONTAINING A SULFONIC ACID GROUP

The invention relates to a process for the production of a concentrated solution, devoid of carboxylic acids, of an anionic azo dye from a diazo component and a coupling component by diazotization and coupling in the solvent or solvent mixture or a portion thereof which is required as solvent in the concentrated solution. More particularly, the invention relates to a method of preparing the dyes by carrying out the diazotization with a nitrous acid ester of an aliphatic compound containing a hydroxyl group in a particular class of solvents useful as at least one part of the required concentrated dye solution.

Suitable anionic dyes include monoazo and/or polyazo dyes containing sulfo groups and preferably from one to four sulfo groups and one or two azo groups, i.e. mono- or disazo dyes. Dyes having one or two sulfo groups are of particular significance industrially.

The diazo components of the dyes are preferably from the aniline, aminonaphthalene, benzidine or aminoazobenzene series. Phenols, naphthols, aminonaphthols, diphenylamines, N-substituted naphthylamines, acetoacetanilides and pyrazolones are particularly suitable as coupling components.

The diazo components, in addition to sulfo groups, may contain as substituents for example chloro, bromo, nitro, acetylamino, benzoylamino, carboxyl, methyl, ethyl, methoxy, ethoxy, alkylsulfonyl, phenylsulfonyl, sulfamoyl or N-(lower)alkylsulfamoyl.

Examples of substituents for the coupling components (in addition to sulfo groups) are: carboxyl, amino, alkanoylamino, benzoylamino, alkyl (methyl, ethyl), chloro and bromo.

Examples of diazo components are:
2-aminobenzenesulfonic acid,
3-aminobenzenesulfonic acid,
4-aminobenzenesulfonic acid,
2-aminotoluenesulfonic acid-(4),
2-aminotoluenesulfonic acid-(5),
4-aminotoluenesulfonic acid-(2),
4-aminotoluenesulfonic acid-(3),
2-amino-3,5-dimethylbenzenesulfonic acid,
5-amino-2-chlorobenzenesulfonic acid,
2-amino-5-chlorobenzenesulfonic acid,
3-amino-4-chlorobenzenesulfonic acid,
2-amino-4,5-dichlorobenzenesulfonic acid,
4-amino-2,5-dichlorobenzenesulfonic acid,
4-amino-6-chlorotoluenesulfonic acid-(3),
2-amino-3-chlorotoluenesulfonic acid-(5),
4-amino-2-chlorotoluenesulfonic acid-(5),
2-amino-5-nitrobenzenesulfonic acid,
2-amino-5-acetylaminobenzenesulfonic acid,
1-amino-4-methoxybenzenesulfonic acid-(2),
1-amino-4-methoxybenzenesulfonic acid-(3),
1-amino-2-methoxybenzenesulfonic acid-(4),
1-aminobenzenedisulfonic acid-(2,4),
1-aminobenzenedisulfonic acid-(2,5),
naphthylamine-(1)-sulfonic acid-(4),
naphthylamine-(1)-sulfonic acid-(5),
naphthylamine-(1)-disulfonic acid-(2,4),
naphthylamine-(1)-disulfonic acid-(3,6),
naphthylamine-(1)-disulfonic acid-(4,6),
naphthylamine-(2)-sulfonic acid-(1),
naphthylamine-(2)-sulfonic acid-(5),
naphthylamine-(2)-sulfonic acid-(6),
naphthylamine-(2)-sulfonic acid-(8),
naphthylamine-(2)-disulfonic acid-(4,8),
naphthylamine-(2)-disulfonic acid-(5,7),
naphthylamine-(2)-disulfonic acid-(6,8),
4-aminoazobenzenesulfonic acid-(4'),
4-aminoazobenzenedisulfonic acid-(3,4'), aniline,
4-acetylaminoaniline,
3-N-phenylsulfamoylaniline,
2,4-dimethylaniline,
o-toluidine, m-toluidine, p-toluidine,
o-chloroaniline, m-chloroaniline, p-chloroaniline,
o-nitroaniline, m-nitroaniline, p-nitroaniline,
2-chloro-4-nitroaniline,
2-amino-5-nitroanisol,
4-aminoazobenzene, benzidine,
benzidine disulfonic acid-2,2',
4,4'-diaminodiphenyl sulfide,
o-aminobenzenesulfone-N-ethyl-N-phenylamide,
2-aminodiphenylsulfone, 3-aminophthalo-N-tolylmide,
4,4'-diaminostilbenedisulfonic acid-2,2',
o-aminobenzoic acid, m-aminobenzoic acid and p-aminobenzoic acid.

Specific coupling components are as follows:
3-methyl-1-hydroxybenzene,
4-methyl-1-hydroxybenzene,
1,3-dihydroxybenzene,
4-chlor-1-hydroxybenzene,
1-hydroxynaphthalene,
2-hydroxynaphthalene,
1,2-dihydroxynaphthalene,
1,3-dihydroxynaphthalene,
1,5-dihydroxynaphthalene,
1,6-dihydroxynaphthalene,
2,3-dihydroxynaphthalene,
2,6-dihydroxynaphthalene,
2,7-dihydroxynaphthalene,
1-hydroxynaphthalenesulfonic acid-(4),
1-hydroxynaphthalenesulfonic acid-(5),
1-hydroxynaphthalenesulfonic acid-(6),
1-hydroxynaphthalenedisulfonic acid-(3,6),
1-hydroxynaphthalenedisulfonic acid-(3,8),
1-hydroxynaphthalenedisulfonic acid-(4,6),
1-hydroxynaphthalenedisulfonic acid-(4,7),
1-hydroxynaphthalenetrisulfonic acid-(3,6,8),
2-hydroxynaphthalenesulfonic acid-(4),
2-hydroxynaphthalenesulfonic acid-(6),
2-hydroxynaphthalenesulfonic acid-(8),
2-hydroxynaphthalenedisulfonic acid-(3,6),
2-hydroxynaphthalenedisulfonic acid-(5,7),
2-hydroxynaphthalenedisulfonic acid-(6,8),
2-hydroxynaphthalenetrisulfonic acid-(3,6,8),
1,8-dihydroxynaphthalenesulfonic acid-(4),
1,8-dihydroxynaphthalenedisulfonic acid-(3,6),
6-amino-1-hydroxynaphthalenesulfonic acid-(3),
6-acetylamino-1-hydroxynaphthalenesulfonic acid-(3),
7-amino-1-hydroxynaphthalenesulfonic acid-(3),
8-amino-1-hydroxynaphthalenesulfonic acid-(5),
8-amino-1-hydroxynaphthalenedisulfonic acid-(5,7),
8-amino-1-hydroxynaphthalenedisulfonic acid-(3,5),
8-amino-1hydroxynaphthalenedisulfonic acid-(3,6),
diphenylamine,
N-β-hydroxyethyl-N-ethyl-m-toluidine,
acetoacetanilide, acetoacetanisidide, acetoacettoluidide, 1-phenyl-3-methylpyrazolone-5,
1-sulfophenyl-3-methylpyrazolone-5,
1-(2'-chloro-5'-sulfophenyl)-3-methylpyrazolone-5,
1-(2', 5'-dichloro-4'-sulfophenyl)-3-methylpyrazolone-5,
2-phenylindole,
1-methyl-2-phenylindole,
2-phenylindole-5-sulfonic acid,
1-methyl-2-phenylindole-5-sulfonic acid and
2,3,3-trimethylindolenine.

Examples of dyes which are of particular industrial significance are those characterized by the following C.I. numbers of formulae:

C.I. 13065, 13080, 13090, 13091, 14270, 14275, 14600, 14720, 14730, 14895, 15510, 15575, 15620, 15640, 15985, 16020, 16045, 16050, 16100, 16120, 16130, 16510, 16185, 16255, 16290, 16570, 16575, 16600, 16645, 17750, 17755, 18050, 18055, 18695, 18900, 18930, 18960, 18965, 22890, 22905, 22910, 26520, 26780, 26900, 26905, 27000, 27190, 27195, 27290

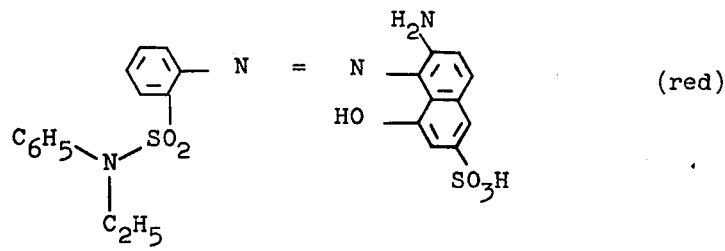 (red)

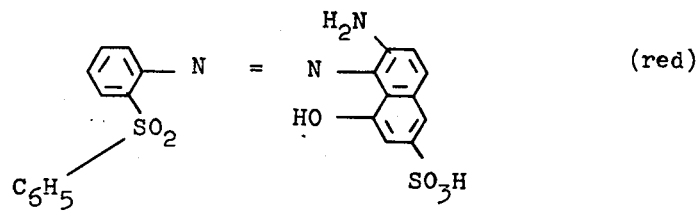 (red)

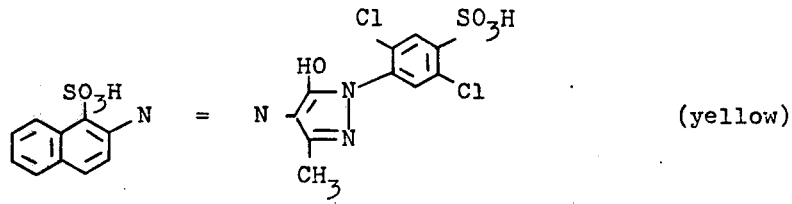 (yellow)

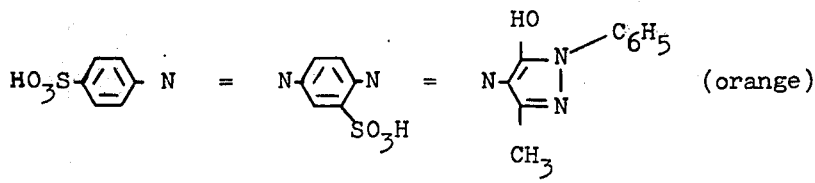 (orange)

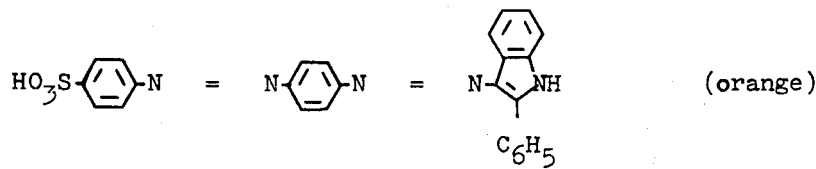 (orange)

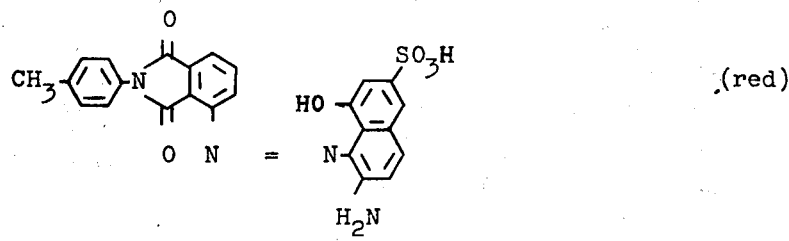 (red)

The azo dyes may be present in the solutions as free acids, alkali metal salts or ammonium salts. Suitable alkali metal salts are potassium and preferably sodium salts.

Ammonium salts are particularly preferred for reasons of stability and solubility.

Ammonium cations for the purposes of the present invention include the ammonium cation itself and N-substituted cations derived therefrom and preferred subtituents are alkyl of one to four carbon atoms, hydroxyalkyl of two or three carbon atoms, hydroxyalkoxyalkyl of four to six carbon atoms and alkoxyalkyl of three or four carbon atoms.

Specifically the ammonium cations may be derived for example from the following amines:

monomethylamine, dimethylamine, trimethylamine,
monoethylamine, diethylamine, triethylamine, monopropylamine, dipropylamine, tripropylamine,
monobutylamine, dibutylamine, tributylamine,
monohydroxyethylamine, dihydroxyethylamine, trihydroxyethylamine, monohydroxypropylamine, dihydroxypropylamine, trihydroxypropylamine,
N-methyl-N-hydroxyethylamine,
N,N-diethyl-N-β-hydroxyethylamine,
N-methyl-N-dihydroxyethylamine,
N,N-dimethyl-N-β-hydroxypropylamine,
N-butyl-N-hydroxyethylamine,
N,N-dibutyl-N-β-hydroxyethylamine,
N-ethyl-N-hydroxyethylamine,
N-ethyl-N-methoxyethylamine, morpholine, piperidine,
hydroxyethylmorpholine, ethylenediamine and hexamethylenediamine.

Quaternary ammonium cations, for example tetramethylammonium, are also suitable.

Examples of solvents which (in addition to water) may be contained in the solvent mixtures present in the method of the invention are: water-soluble solvents from the series of aliphatic low molecular weight amides, nitriles, lactones, alcohols, glycols and polyols or their low molecular weight esters, ethers and oxyalkylation products.

The following are specific examples: methanol, ethanol, propanol, ethylene glycol, propylene glycol, diethylene glycol, thiodiethylene glycol, dipropylene glycol, butanediol, β-hydroxypropionitrile, pentamethylene glycol, ethylene glycol monoethyl ether, ethylene glycol monopropyl ether, ethylene diglycol monoethyl ether, triethylene glycol monobutyl ether, formamide, dimethylformamide, pyrrolidone, N-methylpyrrolidone, glycol acetate and butyrolactone.

Among these solvents the following are preferred: butyrolactone, dimethylformamide, N-methylpyrrolidone, glycols of two to nine carbon atoms and glycol ethers of three to 10 carbon atoms.

Auxiliaries and additives conventionally added in dyeing with solutions, for example antifoams, may also be present in the solutions prepared according to the invention.

The ratio of solvent to water may be varied within wide limits and depends on the solubility of the dye. It is preferably chosen within the range from 1:4 to 4:1.

Solutions prepared according to the invention are surprisingly strong in color. They contain from 10 to 65%, preferably from 20 to 50%, by weight of dye, based on the weight of solution, i.e. they surprisingly contain a multiple of the amount of dye contained in solutions which have been obtained by dissolving press cakes formed in the conventional production of powdered dyes. As compared with solutions obtainable by dissolving commercial material the concentration may often be more than tenfold.

The dye concentrates obtainable by the method of the invention may be diluted very simply with water to the concentration required, because they have unlimited miscibility with water. Because of their liquid, truly dissolved condition they facilitate the use of time-saving continuous dyeing methods.

The process of the invention is carried out by performing the diazotization and coupling in the solvent mixture or a portion thereof and then adding any remaining constituents. A solution ready for use is then obtained by filtration.

Diazotization is carried out with an alkyl nitrite. In this way it is possible to prepare dye solutions which are devoid of metal ions, i.e. other than the permissible alkali metal ions, all other metal ions and especially heavy metal ions may be excluded from the reaction mixture and the desired concentrated dye solution. If desired a dye salt having improved solubility or a solubility adapted to the particular use may be produced by adding a base yielding a cation, particularly an amine. Another advantage of the new process which is important for the stability of the stock solutions to be prepared according to the invention consists in the fact that in this way mixtures of dye acids or their salts or different salts of one dye acid can be obtained in the simplest possible way.

As compared with conventional manufacture of the corresponding powder dyes it is a further advantage of the new process that important diazo components such as sulfanilic acid, toluidinic acid or 1,4-aminonaphthalene sulfonic acid can be used immediately in the particularly economical crude form so that purification of these intermediates is unnecessary.

Suitable alkyl nitrites for the diazotization are any nitrous esters provided the alcoholic radical of the ester remaining in the dye solution has adequate solubility therein and in water or, in the case of inadequate solubility, can be separated as a separate phase. When nitrous esters of long chain alcohols, for example octyl alcohol, are used the alcohol radical remaining in the stock solution after phase separation has an excellent defoaming effect. It is preferred to use alkyl nitrites derived from the abovementioned water-miscible solvents containing hydroxyl groups, particularly glycols.

It is astonishing that in the new process the diazotization of amines containing sulfo groups proceeds so smoothly and at a high rate in the usually heterogeneous mixture containing only solvent besides water, without additional acid; usually diazotizations have to be carried out in the presence of strong inorganic acids whose acidity and amount is sufficient for salt formation with the amine to be diazotized (which is usually only weakly basic) so as to avoid coupling with the amine itself. For this purpose it is customary to use for each mole of diazo component 2.5 moles of a strong acid, for example hydrochloric acid, at least 2.0 moles being necessary theoretically when diazotizing with an alkali metal nitrite. When using an alkyl nitrite however the use of any strong acid whatever can surprisingly be dispensed with. In spite of this the diazotization proceeds practically quantitatively and the formation of diazoamino compounds is suppressed. When the diazotization of for example diazo components devoid of sulfonic acid groups is carried out with strong acids such as hydrochloric acid, sulfuric acid or phosphoric acid these are not harmful in the solutions prepared according to this invention.

The dye yields in the new process are excellent.

Since a ready-to-use solution is immediately obtained in the new process the wasteful and expensive isolation of the dye in the form of the free sulfonic acid necessary in the production of solutions according to Belgian Pat. No. 631,379 can be dispensed with.

In contrast to the production of powdered dyes, there is no effluent in the new process because by filtration of the ready-to-use solutions only small amounts of solid impurities are separated. Although the solutions may therefore contain dissolved impurities, they are surpisingly at least equivalent tinctorially to powdered dyes.

In spite of their high content of dye the solutions of the invention have the nature of true solutions and the upper limit to the dye content is determined by the requirement that the stock solutions should have good flowability. They have excellent stability in storage even at low temperatures and can be kept more or less indefinitely. Even after storage for months it is impossible to detect either decomposition or crystallization of the dissolved dye or any other change in concentration, for example by separation into components such as may occur in the case of dye dispersions. Consequently the stock solutions need not be stirred or shaken prior to use and they can be filled into and shipped in particularly economical large containers without any risk. Standardization can be effected by adding an appropriate solvent or water.

Shading dyes, antifoams and if desired dyeing auxiliaries may also be used.

The solutions obtainable by the method of the invention may be easily metered by volume or by weight and are therefore suitable for modern continuous metering units in the production of dye solutions. They are also useful in the paper and textile industries and also in other fields by the methods conventionally used for acid dyes, for example for coloring cosmetic preparations, wood stains or inks.

By way of elaboration it may be said that the said method for the production of solutions may also be used to prepare the corresponding powdered dyes which as a rule may be isolated by adding water and alkali metal salts to the coupled reaction mixture.

The production of the solutions is described in the following Examples which illustrate the invention without involving any limitation. Parts and percentages are by weight; temperatures are given in degrees Celsius.

EXAMPLE 1

52 Parts of aminobenzenesulfonic acid-(4) is stirred with 100 parts of water and 28 parts of dipropylene glycol dinitrite is gradually added at a temperature of from about 5° to 10°. The whole is stirred for another 3 hours, any excess of nitrite is destroyed with a small amount of sulfamic acid and the suspension of the diazonium salt is then allowed to flow into a solution, cooled to 0° 5°, of 43.2 parts of β-naphthol, 100 parts of water, 150 parts of dipropylene glycol and 30.5 parts of monoethanolamine while stirring and rinsed with 25 parts of water. The whole is stirred for another half hour, filtered for clarification and a concentrated solution of the dye C.I. Acid Orange 7 (C.I. 15,510) is obtained which is stable in storage.

EXAMPLE 2

34.6 Parts of aminobenzenesulfonic acid-(4) is stirred into 60 parts of water and diazotized at 0° to 5° with 19 parts of dipropylene glycol dinitrite. Three hours later any small excess of nitrite is destroyed with sulfamic acid and while continuing to cool while stirring a solution of 64.6 parts of 1-(2′, 5′-dichloro-4′-sulfophenyl)-3-methylpyrazolone-(5) in 50 parts of water, 100 parts of triethylene glycol and 21 parts of N,N-dimethylisopropanolamine are added. A solution of 20 parts of N,N-dimethylisopropanolamine in 100 parts of triethylene glycol is then allowed to flow in and the whole is further stirred until the coupling is over. Filtration gives a stock solution of the dye C.I. Acid Yellow 17 (C.I. 18,965) which is stable in storage.

EXAMPLE 3

34.6 Parts of aminobenzenesulfonic acid-(4) is diazotized as described in Example 2 and in about 15 minutes at 0° to 5° to a solution of 32.2 parts of 2,4-dihydroxyquinoline, 250 parts of water, 150 parts of triethylene glycol and 51 parts of N,N-dimethylisopropanolamine is added while stirring. After the coupling is over filtration gives a stock solution of the dye C.I. Acid Dye 19,340 which is stable in storage.

EXAMPLE 4

10 Parts of dipropylene glycol dinitrite is added at 0° to 5° to 22.3 parts of naphthylamine-(2)-sulfonic acid-(6), 50 parts of water and 100 parts of triethylene glycol and the whole is stirred for 3 hours until diazotization is ended. 14.4 parts of β-naphthol is added followed slowly by a solution of 6.1 parts of monoethanolamine in 50 parts of triethylene glycol and the whole is stirred unitl coupling is over. Filtration gives a stock solution of the dye C.I. Acid Red 10 (C.I. 15,640) which is stable in storage.

EXAMPLE 5

22.3 Parts of naphthylamine-(2)-sulfonic acid-(6) is diazotized with 10 parts of dipropylene glycol dinitrite in 50 parts of water and 100 parts of triethylene glycol at 0° to 10°. After stirring for another 3 hours any remaining nitrite is removed with a little sulfamic acid and while continuing the cooling a solution of 22.4 parts of naphthol-(1)-sulfonic acid-(4), 10.3 parts of N,N-dimethylisopropanolamine, 25 parts of water and 50 parts of triethylene glycol is dripped in. The whole is further stirred overnight, given a filtration and a stock solution of the dye C.I. Acid Red 102 (C.I. 14,730) is obtained which is stable in storage.

EXAMPLE 6

49 Parts of dipropylene glycol dinitrite is added at 0° to 5° to 93.6 parts of 2-aminotoluenesulfonic acid-(5) in 86 parts of butyrolactone and 90 parts of water and the mixture stirred for another 5 hours. A slight excess of nitrite is destroyed with sulfamic acid, 72.1 parts of β-naphthol is added and a solution of 75 parts of triethanolamine and 32 parts of water is dripped in over about 10 hours. The whole is further stirred until coupling is over, given a filtration and a stock solution of the dye C.I. Acid Orange 8 (C.I. 15,575) is obtained which is stable in storage.

EXAMPLE 7

A suspension of 86.6 parts of aminobenzenesulfonic acid-(4) in 130 parts of water and 50 parts of dipropylene glycol is cooled to 0° to 5° and 49 parts of dipropylene glycol dinitrite is allowed to drip in. After 2 hours a slight excess of nitrite is destroyed by adding 0.5 part of sulfamic acid and 72.1 parts of β-naphthol and 50 parts of a solution prepared from 30.7 parts of monoethanolamine, 9 parts of water and 10.3 parts of carbon dioxide are stirred in. Stirring for 15 hours and filtration gives a stock solution of the dye I.C. Acid Orange 7 (C.I. 15,510) which is stable in storage.

EXAMPLE 8

86.1 Parts of benzidinedisulfonic acid-(2,2') is stirred into 100 parts of water and at about 20° 49 parts of dipropylene glycol dinitrite is added slowly and the whole is stirred for 6 hours. Any remaining nitrite is destroyed with a little sulfamic acid, 87.1 parts of 3-methyl-1-phenylpyrazolone-(5) is added and a solution of 123 parts of N,N-diethylethanolamine and 50 parts of water is dripped in. The mixture is stirred for 15 hours and after filtration gives a stock solution of the dye C.I. Acid Yellow 42 (C.I. 22,910).

EXAMPLE 9

86.1 Parts of benzidinedisulfonic acid-(2,2') and 45 parts of N,N-diethylethanolamine are stirred with 100 parts of water at 20° and 49 parts of dipropylene glycol dinitrite is added. After stirring for 3 hours 87.1 parts of 3-methyl-1phenylpyrazolone-(5) is added, stirring is continued overnight at room temperature, and then 14 parts of N,N-diethylethanolamine and 100 parts of water are added. A stock solution of the dye C.I. Acid Yellow 42 (C.I. 22,910) which is stable in storage is obtained by filtration.

EXAMPLE 10

80 Parts of dipropylene glycol dinitrite is added to 148 parts of 4,4'-diaminostilbenedisulfonic acid-(2,2') in 200 parts of water at 5° and the whole is stirred for 3 hours. The suspension obtained is stirred at the same temperature into a solution of 86.4 parts of m-cresol and 93 parts of monoethanolamine. As soon as coupling is over another 132 parts of monoethanolamine is added and the whole is filtered. A stock solution of the dye C.I. Acid Yellow 183 is obtained which is stable in storage.

EXAMPLE 11

43.3 Parts of sulfanilic acid and 80 parts of water are cooled to 0°, 24 parts of dipropylene glycol dinitrite is added and the whole is stirred for 4 hours. Any excess of nitrite present is removed with a little sulfamic acid, 43.5 parts of 3-methyl-1-phenylpyrazolone-(5) is added and a solution prepared from 40 parts of dipropylene glycol, 100 parts of water and 105 parts of monoethanolamine is dripped in. After coupling has taken place the whole is filtered and a stock solution of the dye C.I. Acid Yellow 4 (C.I. 18,695) is obtained which is stable in storage.

EXAMPLE 12

86.1 Parts of benzidine disulfonic acid-(2,2') and 100 parts of water are stirred at 10° to 20° for 3 hours with 49 parts of dipropylene glycol dinitrite and then freed from any remaining nitrite with a little sulfamic acid. 72.1 Parts of β-naphthol is added while stirring and a solution of 158 parts of N,N-diethylethanolamine, 200 parts of diethylene glycol and 150 parts of water is dripped in, the whole is stirred until the coupling is over and filtered for clarification. A stock solution of the dye C.I. Acid Red 97 (C.I. 22,890) is obtained which is stable in storage.

EXAMPLE 13

10 Parts of dipropylene glycol dinitrite is added at 0° to 10° to 27.7 parts of 4-aminoazobenzenesulfonic acid-(4') and 125 parts of water, and the whole is stirred for 5 hours and freed from any excess of nitrite or nitrous acid with a little sulfamic acid. 19.3 Parts of 2-phenylindole is added and stirring is continued at room temperature until the end of the coupling. The addition of 100 parts of N-methylpyrrolidone and 12 parts of monoethanolamine followed by filtration gives a stock solution of the dye C.I. Acid Red 351 which is stable in storage.

EXAMPLE 14

10 Parts of dipropylene glycol dinitrite is added at 10° to 20° to 22.3 parts of naphthylamine-(1)-sulfonic acid-(4) and 70 parts of water and the whole is stirred for 3 hours until reaction has taken place. 22.4 Parts of naphthol-(1)-sulfonic acid-(4) is added and a solution of 23.5 parts of N,N-diethylethanolamine, 20 parts of water and 60 parts of 1,2-propylene glycol is allowed to flow in. The whole is stirred for 15 hours and filtered. A stock solution of the dye C.I. Acid Red 14 (C.I. 14,720) is obtained which is stable in storage.

EXAMPLE 15

86.1 Parts of benzidinedisulfonic acid-(2,2'), 240 parts of water, 45 parts of N,N-diethylethanolamine and 87.1 parts of 3-methyl-1-phenylpyrazolone-(5) are stirred at 0° and 50 parts of dipropylene glycol dinitrite is added. The whole is stirred until coupling is ended. 50 Parts of N,N-diethylethanolamine is added and filtration is carried out. A stock solution of the dye C.I. Acid Yellow 42 (C.I. 22,910) is obtained which is stable in storage.

EXAMPLE 16

44.6 Parts of naphthylamine-(2)-sulfonic acid-(1), 100 parts of water and 40 parts of 5M hydrochloric acid are stirred at 0° to 5° and 20 parts of dipropylene glycol dinitrite is added slowly. After 4 hours any residue of nitrous acid is removed with a little sulfamic acid and the suspension is coupled with continuous cooling with a solution of 64.6 parts of 1-(2',5-dichloro-4'-sulfophenyl)-3-methylpyrazolone-(5), 60 parts of triethanolamine, 12 parts of monoethanolamine and 50 parts of water. The whole is further stirred overnight, filtered for clarification and a stock solution of the dye C.I. Acid Yellow 19 is obtained which is stable in storage.

EXAMPLE 17

49 Parts of dipropylene glycol dinitrite is added at about 10° to 25° while stirring to a suspension of 11.5 parts of naphthylamine-(1)-sulfonic acid-(4) in 75 parts of water. As soon as the nitrite has been used up the diazo suspension is stirred into a mixture of 72 parts of β-naphthol, 88 parts of N-butyldiethanolamine and 200 parts of dimethylformamide, and the mixture is rinsed with 100 parts of dimethylformamide, stirred until coupling is ended and filtered. A stock solution of the dye C.I. Acid Red 88 (C.I. 15,620) is obtained.

EXAMPLE 18

A suspension of 111.5 parts of naphthylamine-(1)-sulfonic acid-(4) in 75 parts of water and 75 parts of butyrolactone is cooled to 0° to 10°, 49 parts of dipropylene glycol dinitrite is gradually added and the mixture stirred for 4 hours until the nitrite has been used up. Then 72 parts of β-naphthol is added and with continuous cooling 90 parts of N-butyldiethanolamine is allowed to flow in slowly. Then the whole is further stirred without cooling until coupling is ended, filtered and a stock solution of the dye C.I. Acid Red 88 (C.I. 15,620) is obtained which is stable in storage.

EXAMPLE 19

23.4 Parts of 2-aminodiphenylsulfone is heated for a short time at about 90° C in the presence of 100 parts of glycol and 12 parts of 12M hydrochloric acid, cooled while stirring to 0° to 5° and at this temperature 10 parts of dipropylene glycol dinitrite is dripped in. The whole is stirred for another 5 hours, any residue of nitrite is destroyed with a little sulfamic acid and 23.9 parts of 7-aminonaphthol-(1)-sulfonic acid-(3) is added. Two hours later 50 parts of water is added and the whole is stirred overnight until coupling is over. Addition of 12 parts of N,N-diethylethanolamine and clarifying filtration gives a stock solution of the dye C.I. Acid Red 42 (C.I. 17,070).

EXAMPLE 20

19.7 Parts of 4-aminoazobenzene is suspended in 100 parts of water, then 12 parts of 10M hydrochloric acid is added, the mixture is cooled to 0° to 5° and while stirring 10 parts of dipropylene glycol dinitrite is allowed to drip in. Four hours later any excess of nitrite is destroyed with a little sulfamic acid and the diazo suspension is allowed to flow slowly while stirring into 80 parts of water, 50 parts of N,N-diethylethanolamine and 30.4 parts of naphthol-(2)-disulfonic acid-(6,8) at about 0°. Clarifying filtration after the coupling is over gives a stock solution of the dye C.I. Acid Red 73 (C.I. 27,290) which is stable in storage.

EXAMPLE 21

A suspension of 86.6 parts of aminobenzenesulfonic acid-(3) in 100 parts of water has 49 parts of dipropylene glycol dinitrite added to it at 0° to 5°. After about 2 hours' stirring when the diazotizing agent has been used up 50 parts of diethylene glycol monobutyl ether is added and then is about 5 hours a solution of 84.6 parts of diphenylamine in 100 parts of diethylene glycol monobutyl ether. The whole is further stirred overnight, 85 parts of N-butyldiethanolamine is added, the whole filtered for clarification and a stock solution of the dye C.I. Acid Yellow 36 (C.I. 13,065) is obtained which is stable in storage.

Instead of the dipropylene glycol dinitrite used in the Examples, other alkyl nitrites may be used with similar success, particularly the compounds described in German Pat. No. 2,144,420 of which the following may be mentioned: the nitrous acid esters of ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, hexanediol or 2,2-dimethylpropanediol-(1,3).

I claim:
1. In a process for the production of an azo dye by diazotization of a diazo component and coupling with a coupling component, the improvement of directly obtaining a concentrated 10 to 65% by weight solution of a water-soluble mono- or disazo dye substituted by 1 to 4 sulfonic acid groups which comprises:

carrying out the diazotization with a nitrous acid ester of a diol of 3 to 6 carbon atoms or a nitrous acid ester of a glycol ether of 3 to 10 carbon atoms, both the diazotization and the subsequent coupling being carried out directly in the solvent required as the solvent of the concentrated solution, with an amount of said diazo and coupling components sufficient to provide an at least about 10% by weight concentrated solution of the azo dye in the solvent, said solvent consisting essentially of water or a mixture of water with a water-soluble organic solvent selected from the group consisting of a low molecular weight aliphatic amide of 1 to 5 carbon atoms, β-hydroxypropionitrile, butyrolactone, methanol, ethanol, propanol, glycols of 2 to 9 carbon atoms, glycol ethers of 3 to 10 carbon atoms and glycol acetate; and adding to the reaction mixture a compound providing an ammonium cation and being selected from the group consisting of ammonia, alkylamines of 1 to 4 carbon atoms, hydroxyalkylamines of 2 to 3 carbon atoms, hydroxyalkoxyalkylamines of 3 or 4 carbon atoms and alkoxyalkylamines of 3 or 4 carbon atoms.

2. A process as claimed in claim 1 wherein said solvent is water.

3. A process as claimed in claim 1 wherein the nitrous acid ester is dipropyleneglycol dinitrite or isopentylglycol dintrite.

4. A process as claimed in claim 1 wherein the ammonia or amine providing the ammonium cation is added in an amount sufficient to form the ammonium salt of the azo dye.

5. A process as claimed in claim 1 wherein the ammonia or amine providing the ammonium cation is added to the reaction mixture after the diazotization.

6. A process as claimed in claim 1 wherein said water-soluble organic solvent is selected from the group consisting of butyrolactone, dimethylformamide, N-methylpyrrolidone, glycols of 2 to 9 carbon atoms and glycol ethers of 3 to 6 carbon atoms.

7. A process as claimed in claim 5 wherein the ratio of said water-soluble organic solvent to water in the solvent required for the concentrated solution is about 1:4 to 4:1.

8. A process as claimed in claim 1 wherein the amount of azo dye in the concentrated solution is about 20 to 50% by weight.

* * * * *

UNITED STATES PATENT AND TRADEMARK OFFICE
CERTIFICATE OF CORRECTION

PATENT NO. : 4,058,517
DATED : November 15, 1977
INVENTOR(S) : Rudolf Bermes

It is certified that error appears in the above-identified patent and that said Letters Patent are hereby corrected as shown below:

Column 12 line 47 "3 to 6" Should read --3 to 10--

Signed and Sealed this

Eleventh Day of April 1978

[SEAL]

Attest:

RUTH C. MASON
Attesting Officer

LUTRELLE F. PARKER
Acting Commissioner of Patents and Trademarks